United States Patent
Duan et al.

(10) Patent No.: US 10,793,019 B2
(45) Date of Patent: Oct. 6, 2020

(54) ELECTRIFIED VEHICLE DC POWER CONVERSION WITH BALANCING OF BATTERY STATES

(71) Applicant: FORD GLOBAL TECHNOLOGIES, LLC, Dearborn, MI (US)

(72) Inventors: Xiaohong Duan, Canton, MI (US); Richard Dyche Anderson, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 259 days.

(21) Appl. No.: 16/103,981

(22) Filed: Aug. 16, 2018

(65) Prior Publication Data
US 2020/0055405 A1      Feb. 20, 2020

(51) Int. Cl.
    *H02J 7/00*      (2006.01)
    *B60L 58/22*     (2019.01)
    *B60L 58/13*     (2019.01)

(52) U.S. Cl.
    CPC ............ *B60L 58/22* (2019.02); *B60L 58/13* (2019.02); *H02J 7/0013* (2013.01);
    (Continued)

(58) Field of Classification Search
    CPC ........... B60L 2210/10; B60L 2240/529; B60L 58/22; B60L 58/13; H02J 7/0021; H02J 7/0018
    See application file for complete search history.

(56) References Cited

U.S. PATENT DOCUMENTS

| 5,625,272 A | 4/1997 | Takahashi |
| 6,873,134 B2 | 3/2005 | Canter et al. |
| (Continued) | | |

FOREIGN PATENT DOCUMENTS

| CN | 100345362 C | 12/2005 |
| JP | 3334742 | 10/2002 |
| (Continued) | | |

OTHER PUBLICATIONS

M. Muneeb Ur Rehman, et al., Control of a Series-Input, Parallel-Output Cell Balancing System for Electric Vehicle Battery Packs, Electrical and Computer Engineering, Utah State University, Logan Utah USA, Electrical, Computer and Energy Engineering, University of Colorado, Boulder Colorado USA, 978-1-4673-6847-6/15 © 2015 IEEE.
(Continued)

*Primary Examiner* — Alfonso Perez Borroto
*Assistant Examiner* — Esayas G Yeshaw
(74) *Attorney, Agent, or Firm* — David B. Kelley; MacMillan, Sobanski & Todd, LLC

(57) ABSTRACT

A high voltage battery pack comprises series-connected battery units, each separately powering a respective DC/DC converter. The converter outputs are coupled in parallel to supply a low-voltage DC bus. A central module has 1) an outer loop controller generating a target current to regulate the bus voltage and 2) an allocator distributing the target current via allocated current commands for respective converters. Local controllers each regulate an output current of a respective converter. The allocator identifies battery units having a predetermined deviation from a reference metric that characterizes the battery pack, allocates reverse currents to respective converters for the identified battery units, and increases the target current commanded for the DC/DC converters not allocated to have a reverse current by the
(Continued)

allocated reverse currents. Battery units with extremely low or high states as compared with the other units are quickly balanced, thereby improving overall performance of the battery pack.

20 Claims, 9 Drawing Sheets

(52) U.S. Cl.
CPC .......... *H02J 7/0014* (2013.01); *H02J 7/0016* (2013.01); *H02J 7/0018* (2013.01); *H02J 7/0019* (2013.01); *H02J 7/0021* (2013.01); *H02J 7/0047* (2013.01); *B60L 2210/10* (2013.01); *B60L 2240/529* (2013.01); *H02J 7/0048* (2020.01)

(56) References Cited

U.S. PATENT DOCUMENTS

| | | | |
|---|---|---|---|
| 7,196,493 B2 | 3/2007 | McGee et al. | |
| 7,489,106 B1 | 2/2009 | Tikhonov | |
| 7,633,783 B2 | 12/2009 | Manabe et al. | |
| 7,750,505 B2 | 7/2010 | Ichikawa | |
| 8,115,446 B2 | 2/2012 | Piccard et al. | |
| 8,395,280 B2 | 3/2013 | Graovac et al. | |
| 8,542,509 B2 | 9/2013 | Sagneri et al. | |
| 8,772,967 B1 | 7/2014 | Ikriannikov et al. | |
| 8,854,008 B2 | 10/2014 | Liu et al. | |
| 8,872,498 B2 | 10/2014 | Goetzenberger et al. | |
| 8,912,736 B2 | 12/2014 | Kim et al. | |
| 9,114,723 B2 | 8/2015 | Bissontz | |
| 9,948,119 B2 | 4/2018 | McMorrow et al. | |
| 2008/0042493 A1* | 2/2008 | Jacobs | H02J 7/0018 307/82 |
| 2009/0316453 A1* | 12/2009 | Manabe | H02P 23/0004 363/78 |
| 2015/0214757 A1* | 7/2015 | Zane | H02J 7/0021 320/107 |
| 2017/0101029 A1* | 4/2017 | Kawano | B60L 53/51 |
| 2017/0297440 A1 | 10/2017 | Hu et al. | |
| 2018/0050597 A1 | 2/2018 | Hand, III et al. | |
| 2018/0050603 A1* | 2/2018 | Hand, III | B60L 15/007 |

FOREIGN PATENT DOCUMENTS

| | | |
|---|---|---|
| JP | 3969165 | 9/2007 |
| JP | 5207055 | 6/2013 |

OTHER PUBLICATIONS

M. Muneeb Ur Rehman, et al., Modular Approach for Continuous Cell-Level Balancing to Improve Performance of Large Battery Packs, United States doi: 10.1109/ECCE.2014.6953991 (2014).

\* cited by examiner

ELECTRIFIED VEHICLE DC POWER CONVERSION WITH BALANCING OF BATTERY STATES

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to electric power systems for electric vehicles, and, more specifically, to methods and apparatus for controlling DC/DC converters to convert a high voltage from a battery pack to a lower voltage for use on a low voltage bus in an electric vehicle.

Electrified vehicles such as battery electric vehicles and hybrid-electric vehicles typically utilize a high voltage power bus driven by a DC power source which may include storage and/or conversion devices such as a multi-cell battery pack. The battery pack may have a plurality of battery cells connected in series in order to provide the necessary power and/or voltage levels. The battery cells require real-time monitoring in order to maximize efficiency and performance, as well as to determine a battery state-of-charge (SOC) to predict a remaining driving range under battery power. Common battery types such as lithium ion (Li-Ion) use a large number of individual battery cells stacked together (connected in series and/or parallel), and groups of cells may be connected hierarchically in groups with monitoring of the groups rather than individual cells. As used herein, battery unit refers to an individual cell or a group of cells treated together.

In addition to the high voltage components associated with driving traction motors in the electrified vehicle, the vehicle also contains lower voltage electrical components and accessories (e.g., control modules, lighting, communications, and entertainment devices) as well as a lower voltage battery for supporting the low voltage components. In order to supply power from the main, high voltage battery pack to the low voltage components and/or to recharge the low voltage battery, a DC/DC converter has been used to down convert the high voltage to an appropriate lower voltage to drive a low voltage power bus.

Although it would be possible to tap into a small section of the battery pack to obtain the lower voltage, the resulting unbalanced drain of power from the battery pack would be undesirable. In order to obtain the necessary voltage conversion and to balance the electrical load among the plurality of battery cells, a bank of DC/DC converters has been used with the input of each converter connected to a different battery cell (or unit of cells) and with the converter outputs connected in parallel, as shown for example in U.S. Pat. No. 8,115,446 of Piccard et al, the disclosure of which is incorporated herein by reference.

A typical battery cell in the battery pack may generate about 4V. A target or setpoint voltage for the low voltage bus may be about 14V, for example. If each DC/DC converter covers one cell, then it is controlled to increase the voltage from 4V to 14V. If each converter covers six cells in series, then it is controlled to decrease the 24V across its input to the desired 14V. The closer the ratio of converter input voltage (of the HV battery unit) to converter output voltage (to the LV bus) is to unity, the higher the efficiency of the conversion. This results in a higher fuel economy, whether you measure fuel economy as energy from the electric grid (BEV), gasoline (HEV), or a combination of the two (PHEV).

U.S. patent application publication US2015/0214757A1 discloses a plurality of DC/DC bypass converters with the outputs likewise connected in parallel, wherein operation of each converter is individually adjusted according to a battery state for its respective battery unit, to thereby decrease a rate of divergence of the battery state from a reference state. Thus, the states of charge for the battery units are more uniform, which improves overall performance of the battery pack. However, a side effect of independently varying the power from each DC/DC converter is that the common output voltage derived from the parallel connection of the converters may not remain constant at the desired value or range of values. A resulting voltage instability on the low voltage DC bus can be detrimental to component operation and to a rapid loss of life of the low voltage battery, especially since the total low voltage power loading may change rapidly during vehicle use.

U.S. patent application publication US2018/0050597A1, which is incorporated herein by reference in its entirety, discloses a control strategy wherein a first controller receives an actual bus voltage and generates a target total current in response to the bus voltage which is adapted to regulate the actual bus voltage to a target voltage. A second controller distributes the target current into a plurality of allocated current commands for respective converters according to respective states of charge of the battery units connected to the converters. As a result, power is drawn from the battery units in a way that balances their states of charge while a stable voltage is maintained on the low-voltage bus. The allocated current commands are transmitted to each DC/DC converter where a controller is responsible for regulating the output of the converter so that it achieves the allocated current. U.S. patent application publication US2018/0050603A1, which is incorporated herein by reference in its entirety, discloses a distributed/cascaded control approach wherein an outer control loop provides slow, coarse control of the total current needed and the distribution of the current to achieve cell balancing. The local controllers provide an inner control loop with faster updating which uses the current commands as well as local feedback on the output voltage to specify the final current draw into each of the converters.

It would be desirable to improve the ability to identify the proper battery states for the battery units and to more quickly adjust the states of battery units having an extremely low or extremely high state (i.e., having a large divergence from a reference state).

SUMMARY OF THE INVENTION

The present invention provides an architecture and a current distributing control strategy adaptable for different types of vehicles at different battery life stages, and handling a variety of vehicle working conditions. It is able to quickly balance the cell units with extremely low or high states as compared with the other cell units in order to improve overall performance of the battery pack and to protect any weaker battery cells.

In one aspect of the invention, an electrified vehicle apparatus comprises a battery pack having series-connected battery units providing a main voltage. A plurality of DC/DC converters each has an input powered by a respective battery unit. The DC/DC converters have respective outputs coupled in parallel to a low-voltage bus. A central module has an outer loop controller generating a target current adapted to regulate a bus voltage on the low-voltage bus to a predetermined voltage, and having an allocator distributing the target current into a plurality of allocated current commands for respective DC/DC converters. A plurality of local controllers each adjusting an output current of a respective DC/DC converter. The allocator 1) identifies a battery unit having a predetermined deviation from a reference metric that characterizes the battery pack, 2) allocates a reverse current to a respective DC/DC converter for the identified battery unit, and 3) increases the target current commanded for the DC/DC converters not allocated to have a reverse current by the allocated reverse current.

DETAILED DESCRIPTION OF PREFERRED EMBODIMENTS

The term "electrified vehicle" as used herein includes vehicles having an electric motor for vehicle propulsion, such as battery electric vehicles (BEV), hybrid electric vehicles (HEV), and plug-in hybrid electric vehicles (PHEV). A BEV includes an electric motor, wherein the energy source for the motor is a battery that is re-chargeable from an external electric grid. In a BEV, the battery or other DC source supplies energy for vehicle propulsion. A HEV includes an internal combustion engine and an electric motor, wherein the energy source for the engine is fuel and the energy source for the motor is a DC storage unit such as a battery. In a HEV, the engine is the main source of energy for vehicle propulsion with the battery providing supplemental energy for vehicle propulsion (e.g., the battery buffers fuel energy and recovers kinematic energy in electric form). A PHEV is like a HEV, but the PHEV may have a larger capacity battery that is rechargeable from the external electric grid. In a PHEV, the battery may be the main source of energy for vehicle propulsion until the battery depletes to a low energy level, at which time the PHEV operates like a HEV for vehicle propulsion.

A typical battery system may include a main battery pack and at least one battery energy controller module (BECM) for monitoring both individual cells and the battery pack as a whole. There may typically be one master BECM with satellite modules with additional sensing and processing. An output of the battery pack is connected via a high voltage bus to an inverter which converts the direct current (DC) power supplied by the battery pack to alternating current (AC) power for operating a traction motor in accordance with commands from a transmission control module (TCM), for example. The BECM, together with various sensors associated with the battery pack, monitors cell voltages, currents, temperatures, and state of charge, for example. The monitored parameters may be used to control various aspects of the electrical power system.

Figure 1:
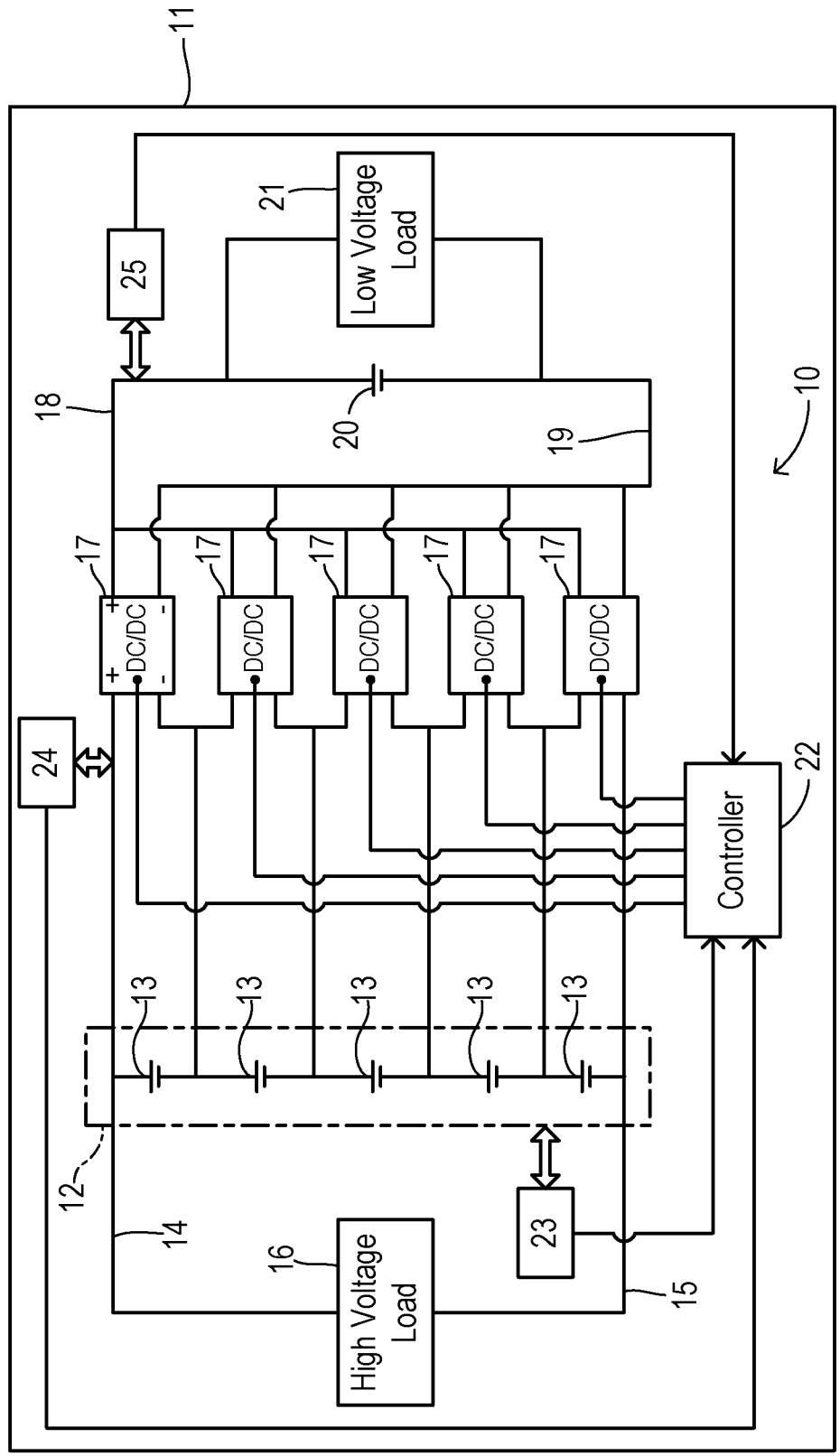
FIG. 1 is a block diagram of an embodiment of an electrical power system of a type used in the invention.

Referring now to FIG. 1, an electrical power system 10 for an automotive vehicle 11 includes a battery pack 12 having a plurality of battery units 13 connected in series to produce a main output voltage of hundreds of volts. Each battery unit 13 may include one or more cells (e.g., Lithium ion cells) connected in series and/or parallel. The main output voltage is applied between a positive high-voltage bus 14 and a negative high-voltage bus 15 for use by high-voltage loads 16 (e.g., an inverter and traction motor). A plurality of DC/DC power converters 17 each has its respective input coupled across a respective one of battery units 13. The outputs of converters 17 are all connected in parallel between a positive low-voltage bus 18 and a negative low-voltage bus 19 for charging a low-voltage (e.g., lead acid) battery 20 and for use by low-voltage loads 21.

A typical configuration for DC/DC power converters 17 may include an input inverter bridge, a resonant circuit (e.g., transformer), and an output rectifier. As known in the art, MOSFETs or other switching devices in the inverter can be switched according to a variable duty cycle and/or frequency in order to regulate an output voltage or current that is output from the rectifier. Thus, a controller 22 is coupled to each converter 17 in order to command a desired operation of each converter. A plurality of sensor arrays 23, 24, and 25 are connected to controller 22 in order to provide parameter measurements necessary to allow controller 22 to properly regulate converters 17. Sensor array 23 may be comprised of at least one BECM for monitoring state of charge, voltage, and current for individual cells or battery units and for the battery pack as a whole. Sensor array 24 is an optional element that monitors input current flowing to each of the converters 17.

Sensor array 25 monitors bus voltage (and optionally the bus current) at low voltage bus 18/19. Using the actual bus voltage, controller 22 is able to provide improved regulation of converters 17 so that undesirable voltage fluctuations on the low-voltage bus are avoided. Such fluctuations are a disadvantage of the prior art.

The common output voltage from parallel DC/DC power converters 17 is a function of the average of the individual converter input voltages, the sum of the output currents, and the sum of the input currents. Since the output currents and the input voltages are not controllable, the only means of controlling the common output voltage is through regulating the sum of the input currents. Thus, the present invention employs a control strategy which allows a system of multiple DC/DC converters whose outputs are connected in parallel to be controlled to reach a target output voltage by directly considering the input currents. The strategy works independently of the manner in which the total current is distributed among the converters. In other words, regulating the sum total of the currents may be comprised of a separate control loop from the strategy that balances the states of charge of the individual battery units. This total input current is then distributed among the converters according to a distribution method described below.

Figure 2:
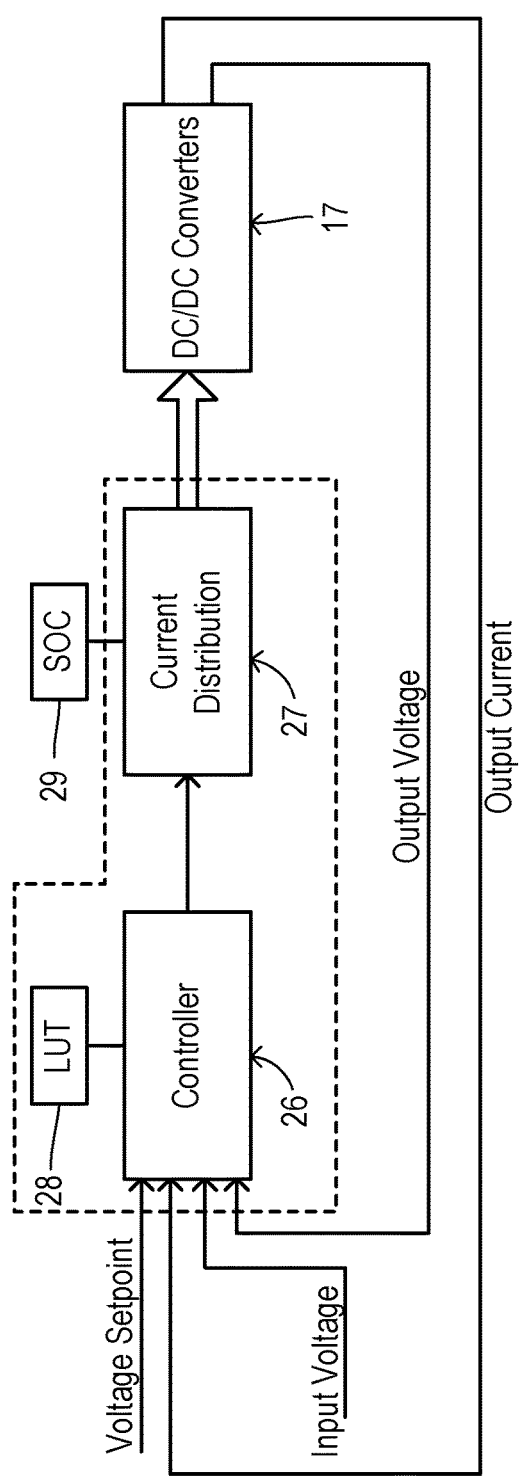
FIG. 2 is a block diagram showing an architecture for controlling the DC power converters.

Controller 22 is preferably comprised of a feedback controller in order to specify a total input current target based on a target voltage (i.e., setpoint voltage for the low-voltage bus) and the measured common output voltage from the DC/DC converters. FIG. 2 shows an embodiment of controller 22 using a total current regulation block 26 and a current distribution block 27. Current regulation block 26 serves as an outer loop controller which receives a voltage setpoint (e.g., a target voltage of 15V for the low-voltage bus) and measured parameter values including an actual bus output voltage and actual bus output current. Current regulation block 26 also receives a measured value for the average input voltage to the converters (i.e., the average output voltage from the respective battery units used for powering the converters). The average battery unit voltage may be obtained from the BECM system, for example. Current regulation block 26 is preferably connected to a lookup table 28 which stores various control values according to the regulation strategy that is employed.

Current distribution block 27 serves as a control loop which receives the target total current from current regulation block 26 and distributes the target current into a plurality of allocated current commands for respective DC/DC converters 17 according to (e.g., in proportion to) respective states of charge (or the cell voltages) of the battery units connected to the DC/DC converters. The states of charge (SOC) are obtained from an SOC block 29 which may be comprised of the BECM system, for example. The target total current signal is a scalar value which is to be distributed. In order to avoid overload of wiring and other issues, the target total current is limited to some predetermined maximum value by regulation block 26. The distributed (i.e., allocated) current signal is a vector of current commands which is sent to the various power converters.

In one embodiment, controller 22 can be a proportional-integral-derivative (PID) controller, wherein any of the P, I, or D terms of the controller may be set to 0. In such an architecture, the regulated output is driven by the error between the setpoint (i.e., target) voltage and the measured voltage, although the derivative term could alternatively be driven solely by the measured voltage.

Figure 3:
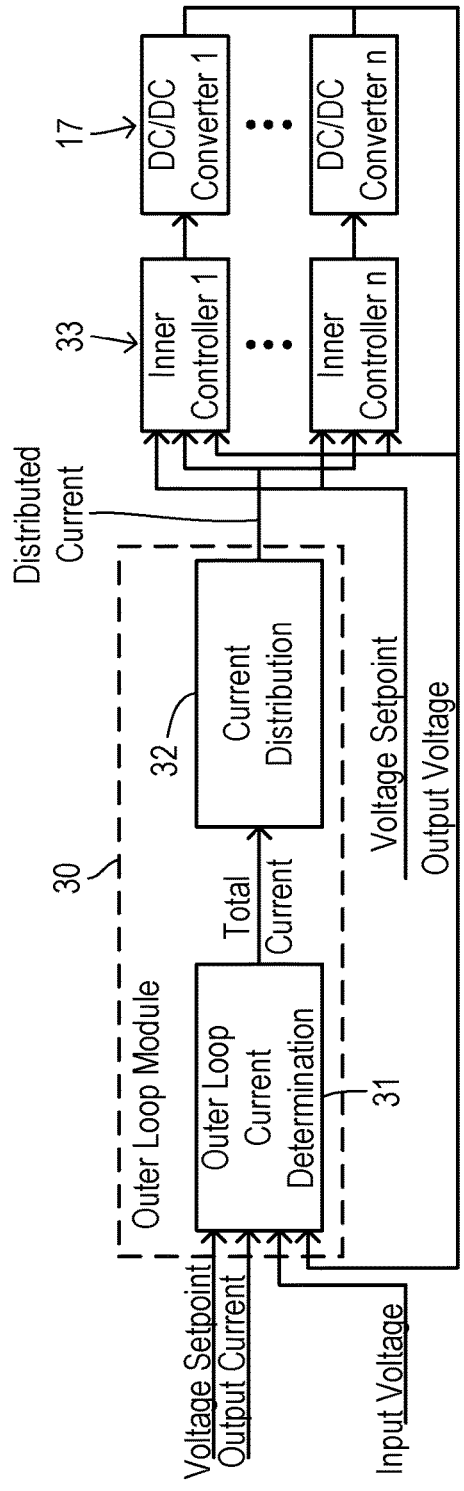
FIG. 3 is a block diagram showing a distributed/cascade architecture.

FIG. 3 shows an alternative embodiment of the invention using a distributed control approach wherein a main "outer loop" module 30 includes an outer loop current determination block 31 (which may have a function which is identical to block 26 in FIG. 2) and a current distribution block 32. Outer loop block 31 determines the total target input current required to maintain the output voltage, and then block 32 determines a current distribution among the respective DC/DC converters based on a remaining state of charge of each respective battery unit (e.g., assigning current values so that energy is drawn from the battery units in a manner that restores balance to, i.e., equalizes, the states of charge) in the same or a similar manner as block 27 in FIG. 2. Alternatively, a measured cell voltage could be used instead of the state of charge. Each of the resulting n allocated current command values are sent to a respective inner or local controller block 33, wherein each inner controller block 33 resides as a local control node in a respective circuit module with a respective one of converters 17. Inner controller blocks 33 utilize the current command values, along with feedback control on the output voltage, to determine a final current to be generated.

Figure 4:
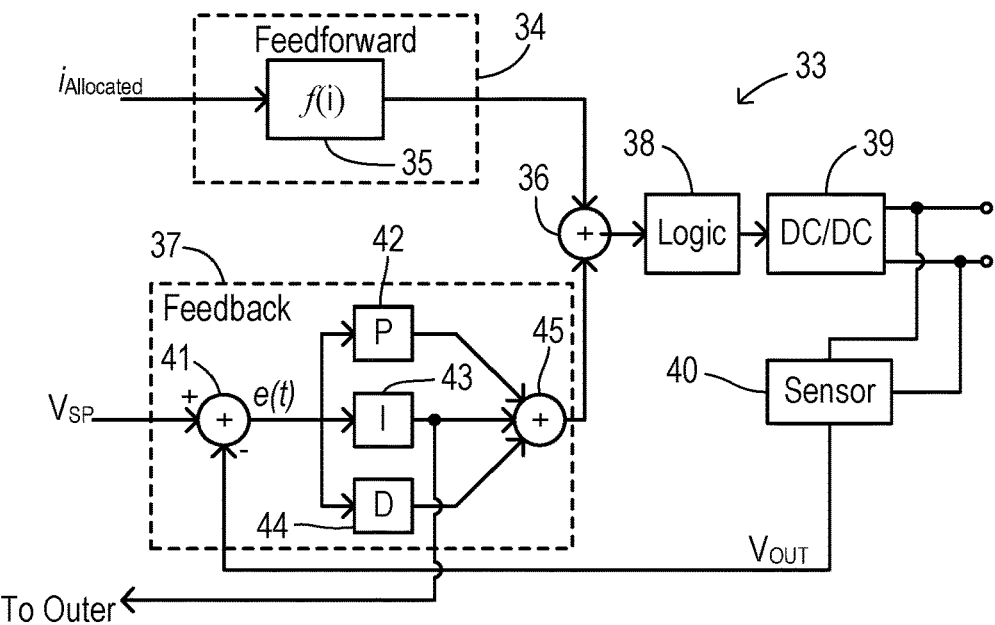
FIG. 4 is block diagram showing a local controller for one DC/DC converter.

FIG. 4 shows a local controller 48 in greater detail. A feedforward section 34 receives a respective allocated current command from the outer loop module to generate a feedforward control variable according to a transfer function 35, designated as f ($i_{allocated}$), which may include a calibration or scaling function, for example. The resulting feedforward control variable is coupled to a positive input of an adder 36. A feedback control section 37 preferably includes a PID controller to generate a feedback control variable which is input to a second positive input of adder 36. The summed control variables are provided to a logic block 38, which may perform known control functions such as saturation avoidance (e.g., by saturating at some arbitrary value), applying rate limiting to the output, and/or transforming the desired current to an actual input command (e.g., duty cycle). A modified control signal is provided from logic block 38 to a respective DC/DC converter 39 which has its output connected to the common output of all the power converters. A voltage sensor 40 senses the output voltage from converter 39 and provides a measured output voltage signal to one input of a subtractor 41 in feedback section 37. A second input of subtractor 41 receives the voltage setpoint or target (e.g., 14V). Thus, subtractor 41 generates an error signal which may be input to a proportional processing block 42, an integral processing block 43, and a derivative processing block 44, all having their outputs combined in an adder 45 to generate the feedback control variable. The input of block 44 could instead receive the output voltage $V_{out}$. By combining the feedforward control variable with the feedback control variable, the invention shown in FIG. 4 has the ability to rapidly achieve and maintain a DC power converter input current which is regulated to the allocated current command while substantially maintaining the desired output low-voltage.

Figure 5:
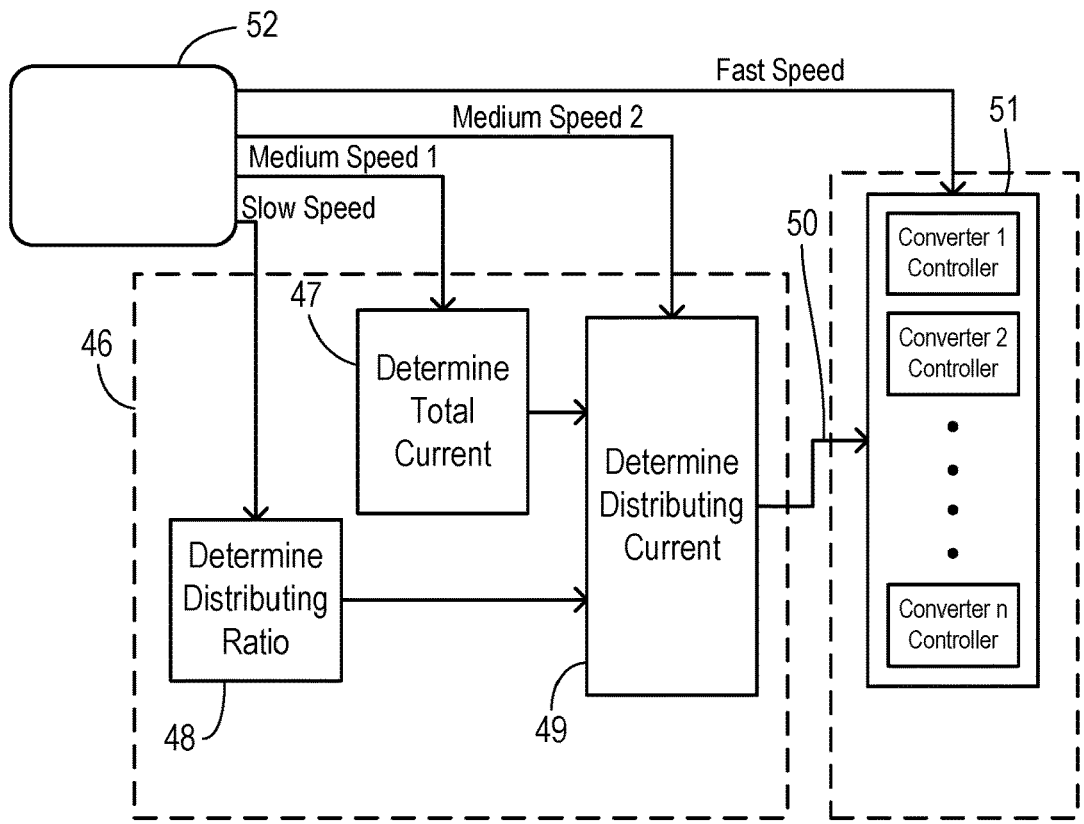
FIG. 5 is a block diagram showing multiple time stepping according to the various functions of the control strategies of the invention.

In order to maintain robust voltage control together with the balancing of the states of charge of the battery units, the control architecture of FIGS. 2-4 provides multiple time stepping as shown in FIG. 5. A central control module 46 has a section 47 for determining the total current flow to be delivered from the DC/DC converters that regulates the common converter output voltage to the setpoint voltage and a section 48 for determining a distribution ratio for each respective battery unit according to the overall reference state of the battery pack and the individual states of the battery units such that the distribution ratio for each battery unit will decrease divergence of the individual states from the overall reference state. Central control module 46 also has a section 49 using the total target current and the distribution ratios to calculate the corresponding individual current commands which are then transmitted over a communication bus 50 to local controllers 51 of the DC/DC converters.

The "battery state" which the invention uses for balancing (i.e., the reference state of the battery pack and the individual state of a battery unit) can be any desirable performance characteristic of a battery such as a state of charge (SOC), power capability, cell health condition, or other battery properties. The value used to characterize a state may be an average value, a mean value, or maximum or minimum values within a battery unit or within the battery pack, for example.

A task scheduler or timer 52 provides timing signals to sections 47-49 and to local controllers 51 to coordinate the updating of the respective control loops. A slowest updating speed is used for determining the distribution ratios. Intermediate (i.e., medium) speeds are used for determining the total target current and for determining the allocated current commands. A fastest speed is used in local controllers 51 so that any changes in the low-voltage DC loads are responded to very quickly.

Optimal relationships for calculating the allocated currents based on the various measured states of the battery units and the reference state all depend upon many variables such as the type of battery, type of vehicle, age of the battery, operating mode of the battery (e.g., charging, discharging in a charge depletion mode, operating in a charge sustain mode), and others. In order to configure a control system to operate in view of many such circumstances, a modular selection system can be used as shown in FIG. 6.

Figure 6:
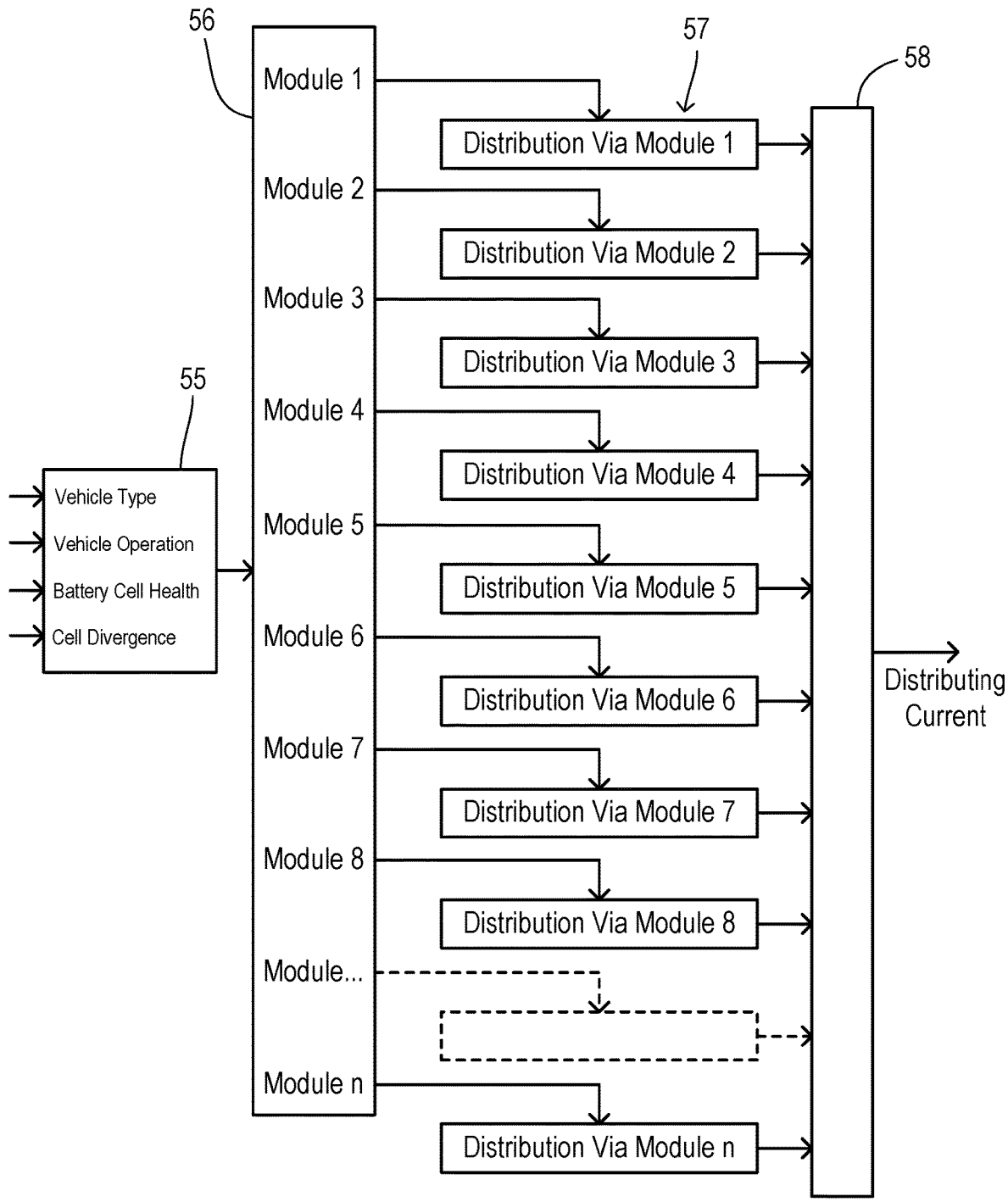
FIG. 6 is a block diagram showing a modular architecture for adapting a control system for use in various different vehicles under a variety of different conditions.

The hardware architecture shown in FIG. 6 can be used in different types of vehicles, such as FHEV, PHEV or BEV. On a vehicle, the battery needs to work in all vehicle operating conditions, and the battery performance properties changes as it ages from new to old. Balancing of the battery states is required for all vehicle operation conditions, in different battery life stages, and on all kinds of vehicles, but the optimal balance targets, methods, and rules used may be different for different vehicle operation conditions, different battery life stages, and different kinds of vehicles. Thus, several different current distribution formulae and methods may be needed in order to effectively achieve the battery balance in different vehicle working conditions, different battery health conditions, and different type of vehicles. For an individual vehicle, the total current distribution targets, methods, and rules may also need to change as the battery ages. In this modular approach, a block 55 is provided within the control system for using various signals available within a vehicle to select an appropriate module for defining the optimal distribution rules (e.g., formulae). Selection may be based on identification of a vehicle type (e.g., hybrid electric or full electric), vehicle operation mode (e.g., charge depletion), battery cell health (e.g., age), and cell divergence (e.g., severity of unbalance). The selection from block 55 is input to a bank or lookup table 56 which stores the predetermined relationships as separate Modules (Module 1, Module 2, . . . , Module n) to be used for balancing according to the distinct operating conditions. Each Module can be used as a distribution/allocation model 57. The selected Module generates current commands that are passed through a multiplexer 58 for transmission to the DC/DC converter controllers.

The Modules can include the following examples. Module 1 is an energy balance module used during an electric drive cycle (e.g., charge depletion or charge sustain) in which the charge decay of the battery cells are close to equal. In Module 1, the battery is balanced for maximum capacity usage of the battery pack. Module 2 is an energy balance module used during battery charging with closely equal decayed battery cells. Module 3 is an energy balance module used during an electric drive cycle for unequally decayed battery cells. In Module 3, the battery is balanced via maximum capacity usage for battery pack among which the differences of the battery units' decay states are outside of a limited range. Module 4 is an energy balance module used during battery charging for unequally decayed battery cells.

Module 5 is a power balance module used during an electric drive cycle (e.g., charge depletion or charge sustain) in which the decay of the battery cells are close to equal. In Module 5, the battery is balanced for maximum power usage of the battery pack. Module 6 is a power balance module used during battery charging for equally decayed battery cells. Module 7 is a power balance module used during an electric drive cycle for unequally decayed battery cells. In Module 7, the battery is balanced via maximum power usage for battery pack among which the differences of the battery units' decay states are outside of a limited range. Module 8 is a power balance module used during battery charging for unequally decayed battery cells. Other potential modules include a Module n which is an LV battery charge HV battery model (e.g., employed before vehicle startup by using the LV battery to charge up the HV battery).

Figure 7:
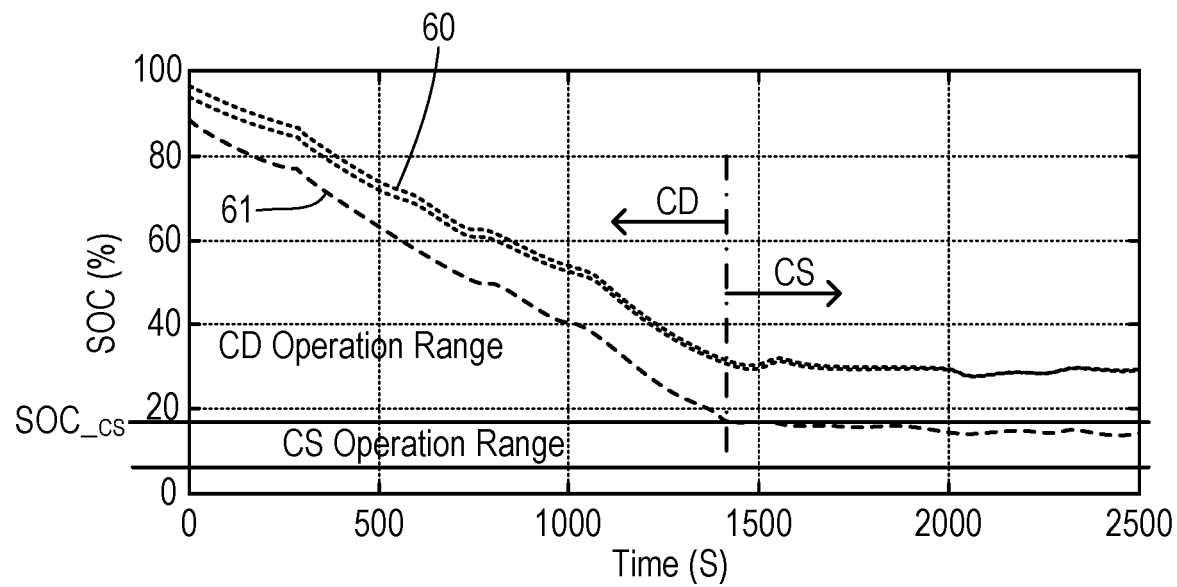
FIG. 7 is a graph showing the impact on performance by a battery unit having an extremely lower state of charge than the average state of the battery pack.

FIG. 7 illustrates a disadvantage of the presence of a battery unit having a significantly lower SOC than what is prevalent within the rest of the battery pack. The discharge capability of a battery pack is limited by the battery unit (cell) having the lowest SOC. During an electric drive cycle with an electric traction motor powered by the battery pack, the individual SOCs of most battery units are closely balanced and decrease together along a trajectory 60. An extremely unbalanced battery unit with a lower SOC follows a trajectory 61. A charge depletion (CD) operation is utilized while the SOCs are above a predetermined threshold (denoted SOC_cs). At or below threshold SOC_cs, a charge sustain (CS) operation is entered (e.g., an internal combustion engine is started in a hybrid vehicle to generate electrical power and/or propel the vehicle). It is desirable to maintain full electric operation as long as possible, otherwise the range (i.e., distance) for driving under electrical power is reduced. However, when the SOC of the single unbalanced battery unit falls below the threshold, the battery pack can no longer support the electric-only drive cycle even though there is significant charge remaining in the other battery units.

A boundary between charge depletion and charge sustaining modes is not necessarily static. Once a vehicle enters charge sustaining mode, it would typically stay there for the duration of a drive cycle even if the SOC drifts back above the threshold to avoid certain drivability issues. Also, a PHEV may have an "EV later" mode (selectable by the user) wherein charge sustaining mode can be triggered at a higher SOC. For example, a vehicle may be driven into an "electric only" area created to restrict exhaust gases or noise in certain environments. Regardless of the strategies selecting between charge depletion and charge sustaining modes, charge balancing among the battery units remains important for optimizing performance of the battery pack.

Figure 8:
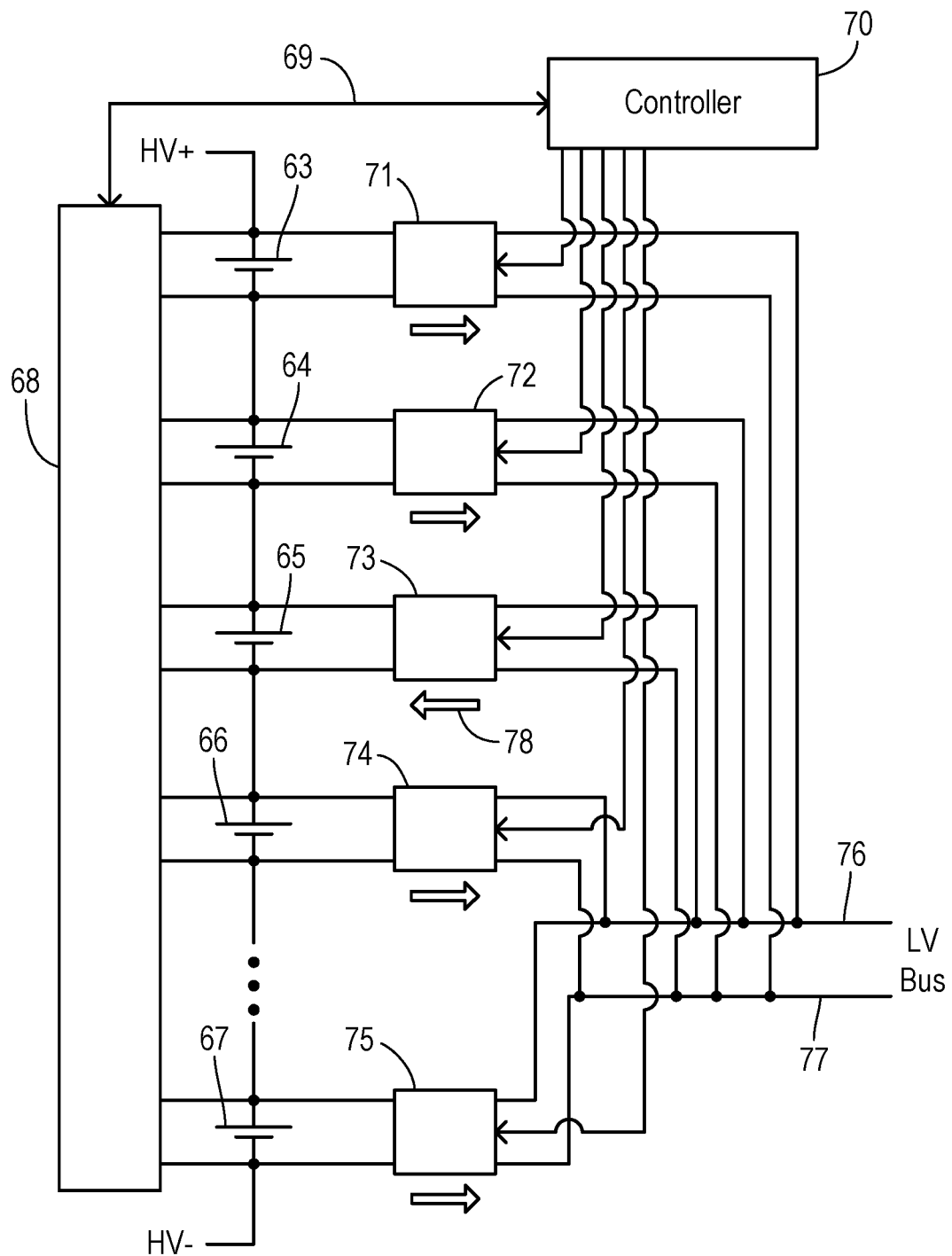
FIG. 8 is a block diagram of a plurality of DC/DC converters wherein the converters can generate either a forward or a reverse current.

The reliance on primarily drawing power from the battery units with a higher SOC for supplying the LV bus may not be sufficient to eliminate the deviation of the battery unit with the lower, unbalanced SOC. To improve the ability of the DC/DC converter system to balance the states of the battery units, the present invention allows bidirectional flow within the converters. In FIG. 8, a battery pack has individual battery units 63-67 connected in series between a high-voltage (HV) bus. Each respective battery unit 63-67 is coupled to a battery monitor 68 for determining various battery parameters such as state of charge, current flow, and battery health for individual battery units and for the pack as a whole. A communication line 69 connects monitor 68 with a controller 70 which, among other things, controls a plurality of DC/DC power converters 71-75. Converters 71-75 have their outputs connected in parallel to a low-voltage (LV) bus with a positive rail 76 and a negative rail 77. Each converter 71-75 is preferably capable of either a forward current flow from the corresponding HV battery unit to the LV bus or a reverse current flow from the LV bus to a corresponding battery unit. For example, an arrow 78 indicates a negative current flow in a converter 73, whereby the divergence of the SOC of a battery unit 65 can be rapidly decreased relative to the other battery units. The sum of all the positive current flows from the power converters minus the sum of all the negative current flows is equal to the total current flow needed for regulating the voltage across the LV bus.

Figure 9:
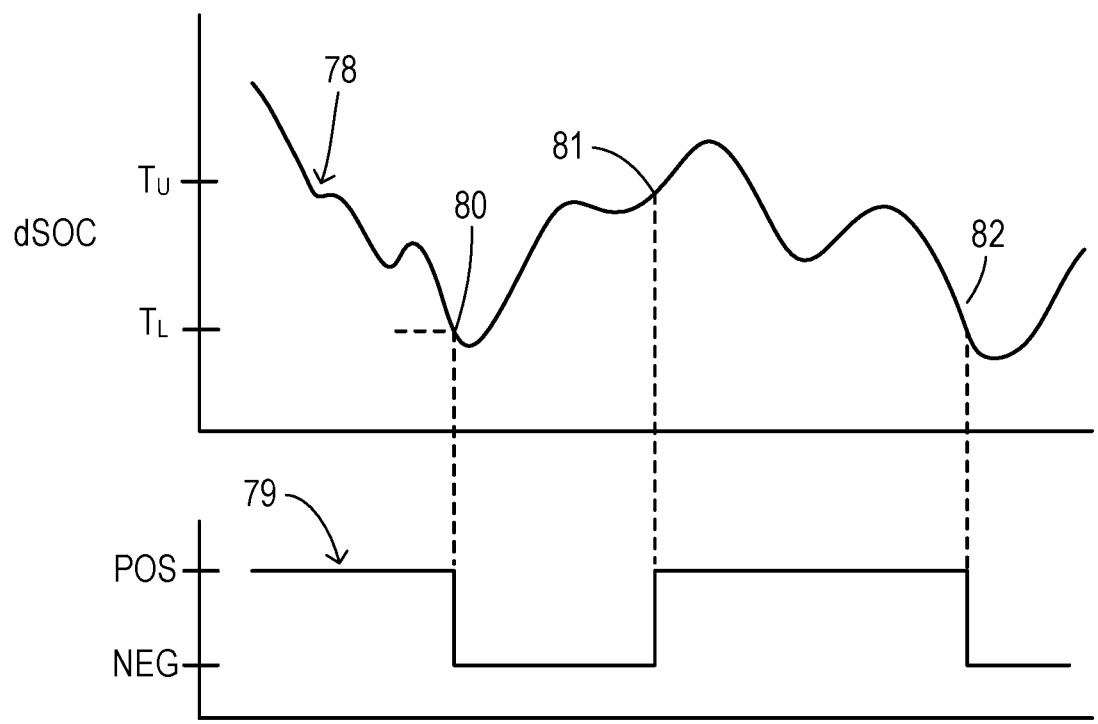
FIG. 9 is a graph with waveform diagrams showing a state of charge deviation which is used to determine a current flow direction for a DC/DC converter.
Figure 10:
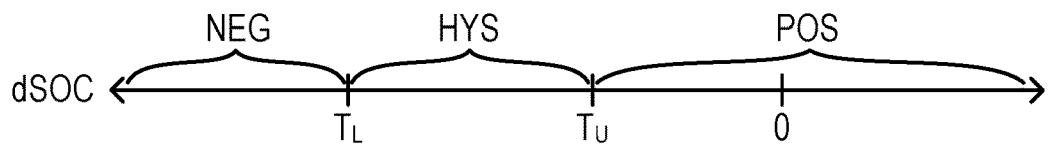
FIG. 10 is a graph illustrating thresholds for defining hysteresis in a bang-bang controller for determining the current flow direction.

The present invention preferably uses a bang-bang controller to determine the flow direction in each converter as shown in FIG. 9. For each battery unit, a divergence of its battery state is determined with respect to a reference state, and the size of the divergence is used to determine a current flow direction. In order to balance the battery state of charge, for example, a reference SOC for the entire battery pack is subtracted from an SOC for each battery unit. The reference SOC may be an average SOC of all the monitored battery units, for example. If the difference is greater than an upper threshold $T_U$ then the current flow is in a positive direction. If the difference is below a lower threshold $T_L$ then the current direction should be negative in order to charge the deviant battery unit. When the difference is between the thresholds, then hysteresis is used to determine whether to switch the flow direction. Upon system initialization, all of the flow directions may be set to a positive or forward direction. As shown by a trace 78 in FIG. 9, the state of charge difference (dSOC) may gradually become increasingly negative until it falls below lower threshold $T_L$ at 80, resulting in a switch of a flow direction signal 79 from positive to negative. The flow direction continues to be negative until the difference signal rises above upper threshold $T_U$ at 81, resulting in the flow direction signal switching to a positive value. Thereafter, the flow direction signal stays positive until the difference signal again falls below lower threshold $T_L$ at 82. FIG. 10 shows an arrangement of the thresholds wherein upper threshold $T_U$ and lower threshold $T_L$ are both negative numbers. Whenever dSOC is more negative than lower threshold $T_L$ then a negative flow is chosen. Likewise, whenever dSOC is greater than upper threshold $T_U$ then current flow direction through a battery unit is positive. When the state of charge deviation dSOC falls between the thresholds then hysteresis is used (i.e., the flow direction maintains its most recent setting).

Figure 11:
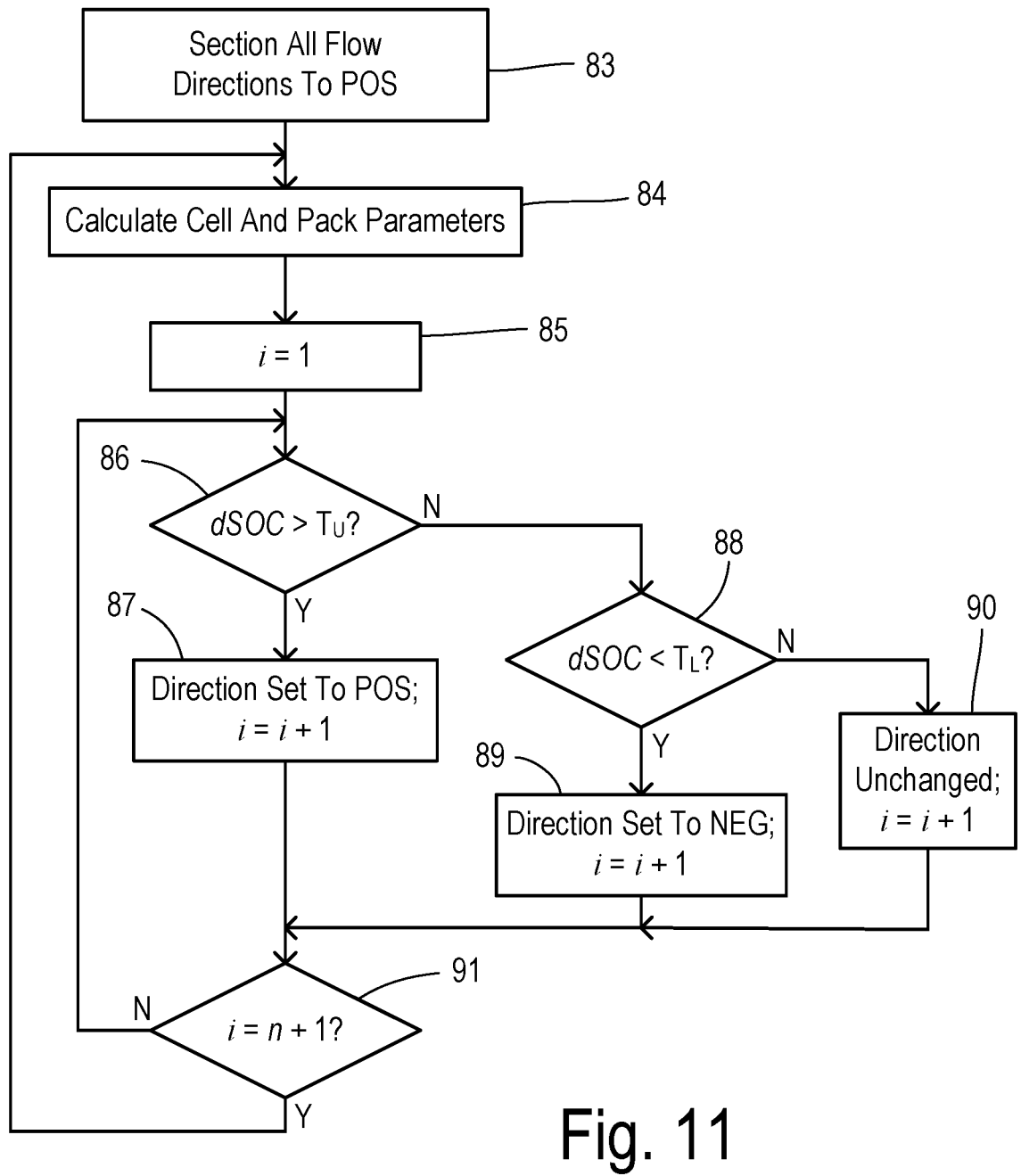
FIG. 11 is a flowchart showing one preferred method for determining current flow direction.

A method for implementing a bang-bang controller with hysteresis is shown in FIG. 11. In step 83, a flow direction for all of the converters are each initially set to be positive. Battery parameters such as state of charge, voltage, current, and other variables are calculated for each of the battery units and for the battery pack in step 84. An index i is initialized to a value of one in step 85. Index i goes from one to n, where n is the total number of converters. For the first converter, the state of charge difference (dSOC) is determined and is then compared with upper threshold $T_U$ in step 86. If the difference is greater than upper threshold $T_U$ then the current direction for the first converter is set to be positive in step 87 and then the value of index i is increased by one. If not greater than upper threshold $T_U$, then difference dSOC is compared with lower threshold $T_L$ in step 88. If less than lower threshold $T_L$, then the current flow direction is set to negative in step 89 and index i is increased by one. If not less than lower threshold $T_L$, then the current flow direction remains unchanged in step 90 and index i is increased by one. After increasing the value of index i, a check is performed in step 91 to determine whether the index has increased above the value of n. If not, then a return is made to step 86 to determine a flow direction for the next converter. When step 91 determines that all converters have been examined, then a return is made to step 84 to recharacterize the battery units and the pack and to reevaluate the current flow directions.

After identifying which converters, if any, should receive a negative current flow, current distribution ratios need to be determined for each converter. For the converters receiving negative current flow, the magnitudes of the individual reverse currents are allocated first. Then a sum of all the negative flow currents is determined so that the additional current burden is distributed among the converters with a positive current flow together with the distributing the current needed for regulating the voltage on the LV bus.

Figure 12:
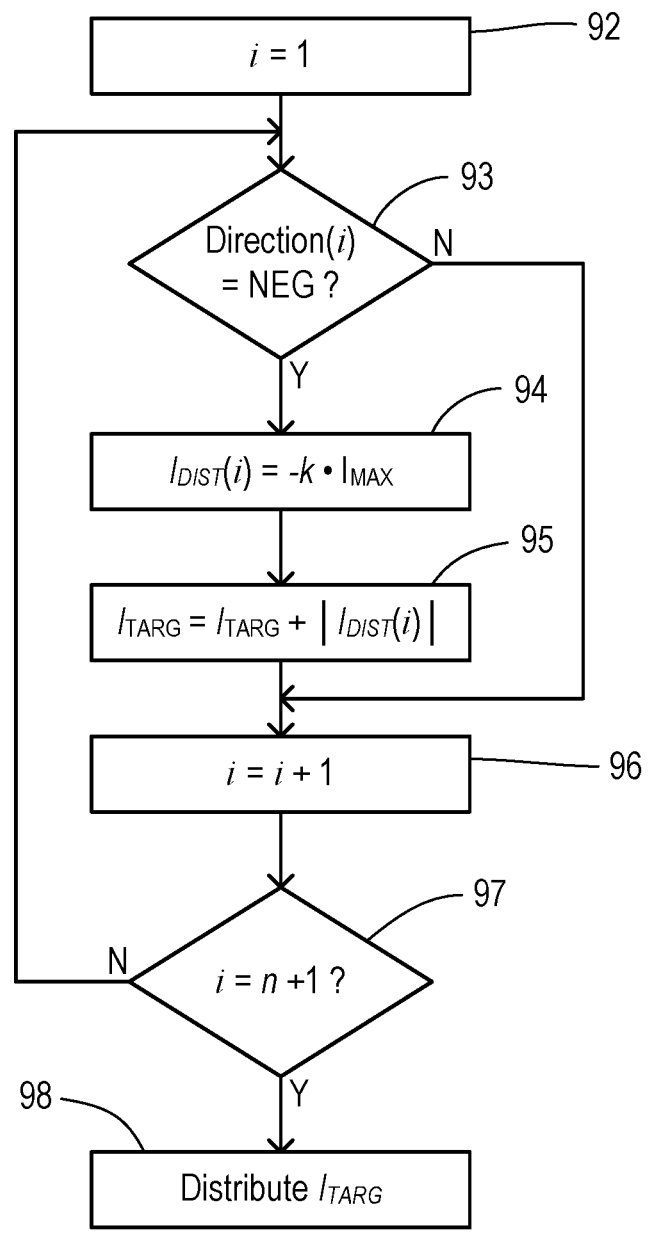
FIG. 12 is a flowchart showing one preferred method for determining a magnitude of a reverse current.

One preferred method for determining the values of the reverse currents is shown in FIG. 12. In step 92, index i is set to one. A flow direction of an ith converter is checked in step 93 to determine whether its flow was assigned to be negative. If so, then a distributed current value for converter i is set in step 94 to be equal to a maximum absolute current $I_{Max}$ of the converter (determined by its design) times a proportionality ratio k as follows:

$$I_{Dist}(i) = -k \cdot I_{Max}$$

where $0<k<1$. The value of k can be a calibrated constant, a variable having a value which depends on the state of charge difference, or a variable based on other properties of the respective battery unit. In step 95, a target positive current $I_{Targ}$ to be the commanded from the converters is increased by the magnitude (i.e., absolute value) of the reverse current assigned to converter i. The index i is increased by one in step 96 and then a check is performed in step 97 to determine whether all the converters have been considered. If not, then return is made to step 93, otherwise the method proceeds to step 98 for distributing the modified (i.e., increased) target current among the converters assigned to have a positive flow direction. Distribution of the positive current flows can be done as disclosed in the patent publications mentioned above. For example, the current distribution ratios may be a function of the state of charge of each respective converter.

Figure 13:
FIG. 13 is a graph illustrating state of charge ranges for determining magnitudes of forward currents to be delivered by the converters.

In a further improvement of the invention, distribution ratios for converters providing a positive current flow are assigned according to weighting factors taking into account a plurality of predetermined ranges of SOC values (or other states) of each respective battery unit. For example, FIG. 13 shows a scale from 0 to 100% SOC, wherein a first threshold $T_1$ defines a low region for SOC values less than $T_1$. A second threshold $T_2$ defines a high region for SOC values greater than $T_2$. The thresholds define a mid region for SOC values between $T_1$ and $T_2$. By considering the regions as shown, a more effective balancing of the states of charge for the battery units can be achieved by increasing the allocated current burden of the most highly charged battery units.

The values for setting the thresholds may be selected according to a battery type, for example. The low and high regions would typically be larger (and the mid region smaller) for a HEV battery than a PHEV or BEV battery. An HEV cell tends to be smaller, so the same amount of current can raise or lower the state of charge more rapidly. Also, HEV battery designs usually seek to provide a cell size resulting in a high power, which restricts the range of SOC operation. In order to ensure a "life-of-the-vehicle" battery (such as a 10 yr/150,000 mile regulatory requirement), operation near the extreme ranges of SOC must be restricted for these batteries. The lower currents relative to the size of the cell in PHEVs and BEVs allow a wider "full power" operation". As used herein, "cell" refers to a battery unit. If multiple cells are placed in a series/parallel arrangement as is common on modern BEV batteries, the capacity of a "cell" is the sum of the capacities of all the interconnected cells.

Figure 14:
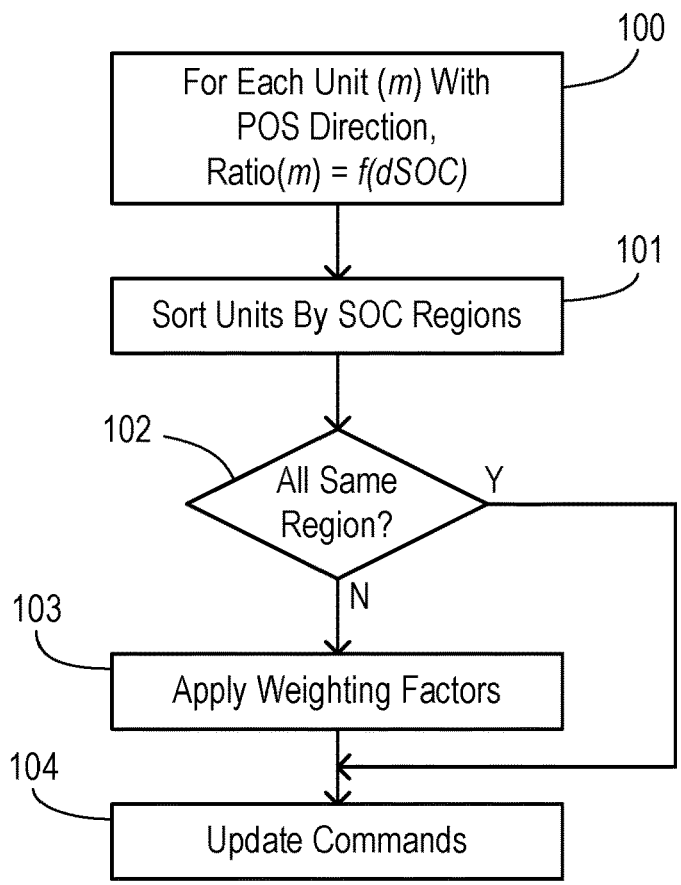
FIG. 14 is a flowchart showing a method for determining weighting factors to apply to the distributed current commands.

In a preferred embodiment shown in FIG. 14, a reference state of charge ($SOC_{reference}$) is determined as a median SOC, arithmetic average SOC, or a maximum or a minimum SOC of the cells in the battery pack. The difference between the SOC of each battery unit and the reference SOC is calculated as $dSOC(i)=SOC_{converter\ (i)}-SOC_{reference}$, and those battery units that should receive a reverse (negative) current flow from its DC/DC converter are identified as described above. For each battery unit providing a forward current flow, an initial distribution ratio is obtained using a function of dSOC, denoted f(dSOC(i)). Converters whose battery units have higher SOC values will generally have a higher value of f(dSOC(i)) than converters whose battery units have lower SOC values (i.e., f(dSOC(i))∝dSOC(i)). A specific numerical relationship for f(dSOC(i)) may be obtained from an appropriate module as shown in FIG. 6, for example. Once the initial distributing ratios are determined in step 100 using f(dSOC(i)), the battery units are sorted according to their SOC regions in step 101. In step 102, a check is performed to determine whether the battery units are all in the same region. If they are all in the same region, then the method jumps to step 104 where the initial ratios are used to update the allocated current commands which are transmitted to each DC/DC converter controller. If all the battery units are not all in the same regions, then weighting factors are applied in step 103 according to the SOC regions before transmitted the allocated current commands in step 104.

More particularly, the distribution ratios for all converters with positive current flow are defined as:

$$\text{Ratio}(i)=w(i)f(dSOC(i)) \text{ for } i=1,2,\ldots m$$

where, m is the number of converters that satisfy condition of $\text{flow}_{direction}(i)=1$ (i.e., a positive flow direction) among the total n converters, wherein m≤n and f(dSOC(i))>0 for i=1, 2, . . . m. Thus, m is not constant but is always a positive integer since there must be at least one converter passing a non-zero current. The weighting factors are then determined as follows:

If SOC of all battery units are in same region, then $w(i) = 1$ for $i = 1, 2, \ldots m$ else $$w(i) = \begin{cases} W_{high} & \text{if } SOC \text{ of battery unit is in high region} \\ W_{mid} & \text{if } SOC \text{ of battery unit is in mid region} \\ 0 & \text{if } SOC \text{ of battery unit is in low region} \end{cases}$$

The value of $W_{high}$ and $W_{mid}$ are determined according to the numbers of battery units with an SOC value belonging to each SOC region. $W_{high}$ and $W_{mid}$ satisfy the conditions that $W_{high} \geq 1$, $0 \leq W_{mid} \leq 1$, and $\sum_{i=1}^{m} \text{Ratio}(i)(t)=1$. In other words, the sum of the weighting factors multiplied by the respective current commands results in the total current being unchanged. In order to ensure that the cell units whose SOC is in the high region are discharged more quickly than other cell units in a different region, the ratio of $$\frac{W_{high}(t)}{W_{mid}(t)}$$

varies with each iteration (i.e., each value of time, t) and is substantially equal to $$\frac{\text{converter}-\text{allowed}-\text{maximum}-\text{flow}}{I_{total}(t) \div m(t)}.$$

Stated in an equivalent manner, the weighting factors for each iteration provide a ratio about:

$$\frac{W_{high}}{W_{mid}} = I_{max} \frac{m}{I_{total}}$$

where $I_{max}$ is the maximum allowed current of each DC/DC converter and $I_{total}$ is the total forward current.

An additional use of the SOC regions can be used in connection with the assignment of a current flow direction. In the event that a particular battery unit satisfies the conditions for having a reverse current flow (i.e., $dSOC<T_L$) but its SOC places it in the High region, then it is instead assigned to have a positive (forward) or zero current flow.

The foregoing invention shows that a plurality of DC/DC bypass converters can be used to individually to adjust the current passing through the converters for achieving the function of reducing the state divergence among battery cell units connected to the converters. Using bidirectional converters and weighting of the allocated currents according to SOC regions of the battery units, it is possible to reduce the SOC divergence and quickly balance the battery units to avoid cells having an extremely higher or lower state of charge.

What is claimed is:

1. Electrified vehicle apparatus comprising:
   a battery pack comprising series-connected battery units providing a main voltage;
   a plurality of DC/DC converters, each having an input powered by a respective battery unit;
   a low-voltage bus, wherein the DC/DC converters have respective outputs coupled in parallel to the low-voltage bus;
   a central module having an outer loop controller generating a target current adapted to regulate a bus voltage on the low-voltage bus to a predetermined voltage, and having an allocator distributing the target current into a plurality of allocated current commands for respective DC/DC converters; and
   a plurality of local controllers each adjusting an output current of a respective DC/DC converter;
   wherein the allocator 1) identifies a battery unit having a predetermined deviation from a reference metric that characterizes the battery pack, 2) allocates a reverse current to a respective DC/DC converter for the identified battery unit, and 3) increases the target current commanded for the DC/DC converters not allocated to have a reverse current by the allocated reverse current.

2. The apparatus of claim 1 wherein the reference metric is comprised of an average battery unit capacity, and the predetermined deviation is comprised of a predetermined difference between the average battery unit capacity and a capacity of a respective battery unit.

3. The apparatus of claim 1 wherein the reference metric is comprised of a state of charge.

4. The apparatus of claim 1 wherein the allocator deallocates the reverse current after the respective DC/DC converter no longer exhibits the predetermined deviation.

5. The apparatus of claim 4 wherein allocation and deallocation of the reverse current is subject to hysteresis for the predetermined deviation.

6. The apparatus of claim 1 wherein the reverse current has a magnitude comprising a fixed proportion of a maximum current of the respective DC/DC converter.

7. The apparatus of claim 1 wherein the reverse current has a magnitude proportional to a difference between the reference metric and a corresponding metric of the identified battery unit.

8. The apparatus of claim 1 wherein the increased target current distributed among DC/DC converters not allocated a reverse current are assigned according to weighting factors determined according to a plurality of ranges of an absolute state of charge of each respective battery unit.

9. The apparatus of claim 8 wherein the ranges are comprised of a low region, a mid region, and a high region, and wherein when there are battery units within more than one of the ranges, then the weighting factors are determined according to a formula:

$$w(i) = \begin{cases} W_{high} & \text{if SOC of battery unit is in } high \text{ region} \\ W_{mid} & \text{if SOC of battery unit is in } mid \text{ region} \\ 0 & \text{if SOC of battery unit is in low region} \end{cases}$$

where w(i) is the respective weighting factor, i is an index from 1 to m, m is the number of converters not allocated a reverse current, $W_{high}$ is greater than or equal to one, and $W_{mid}$ is between zero and one;

wherein a sum of the weighting factors multiplied by the respective current commands results in the total current being unchanged.

10. The apparatus of claim 9 wherein the weighting factors provide a ratio:

$$\frac{W_{high}}{W_{mid}} = I_{max} \frac{m}{I_{total}}$$

where $I_{max}$ is the maximum allowed current of each DC/DC converter and $I_{total}$ is the total forward current.

11. A method of feeding a low voltage bus from parallel DC/DC converters powered by respective battery units of a high voltage battery pack, comprising:
regulating a bus input current;
identifying a battery unit having a predetermined deviation from a reference metric characterizing the battery pack;
allocating a reverse current to a respective converter for the identified battery unit; and
correspondingly increasing a total forward current commanded for converters not allocated to have a reverse current.

12. The method of claim 11 wherein the reference metric is comprised of an average battery unit capacity, and the predetermined deviation is comprised of a predetermined difference between the average battery unit capacity and a capacity of a respective battery unit.

13. The method of claim 11 wherein the reference metric is comprised of a state of charge.

14. The method of claim 11 wherein the reverse current is deallocated after the respective DC/DC converter no longer exhibits the predetermined deviation.

15. The method of claim 14 wherein allocation and deallocation of the reverse current is subject to hysteresis for the predetermined deviation.

16. The method of claim 11 wherein the reverse current has a magnitude comprising a fixed proportion of a maximum allowed current of the respective converter.

17. The method of claim 11 wherein the reverse current has a magnitude proportional to a difference between the reference metric and a corresponding metric of the identified battery unit.

18. The method of claim 11 further comprising the step of:
distributing the increased total forward current among converters not allocated a reverse current according to weighting factors determined according to a plurality of ranges of an absolute state of charge of each respective battery unit.

19. The method of claim 18 wherein the ranges are comprised of a low region, a mid region, and a high region, and wherein when there are battery units within more than one of the ranges, then the weighting factors are determined according to a formula:

$$w(i) = \begin{cases} W_{high} & \text{if SOC of battery unit is in } high \text{ region} \\ W_{mid} & \text{if SOC of battery unit is in } mid \text{ region} \\ 0 & \text{if SOC of battery unit is in low region} \end{cases}$$

where w(i) is the respective weighting factor, i is an index from 1 to m, m is the number of converters not allocated a reverse current, $W_{high}$ is greater than or equal to one, and $W_{mid}$ is between zero and one;

wherein a sum of the weighting factors multiplied by the respective current commands results in the increased total forward current being unchanged.

20. The method of claim 19 wherein the weighting factors provide a ratio:

$$\frac{W_{high}}{W_{mid}} = I_{max} \frac{m}{I_{total}}$$

where $I_{max}$ is the maximum allowed current of each converter and $I_{total}$ is the increased total forward current.

* * * * *